United States Patent
Rapp et al.

(10) Patent No.: US 12,025,221 B2
(45) Date of Patent: Jul. 2, 2024

(54) PARK LOCK MECHANISM FOR A MOTOR VEHICLE

(71) Applicant: Bayerische Motoren Werke Aktiengesellschaft, Munich (DE)

(72) Inventors: David Rapp, Munich (DE); Ralf Richter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/266,353

(22) PCT Filed: Dec. 16, 2021

(86) PCT No.: PCT/EP2021/086201
§ 371 (c)(1),
(2) Date: Jun. 9, 2023

(87) PCT Pub. No.: WO2022/152498
PCT Pub. Date: Jul. 21, 2022

(65) Prior Publication Data
US 2024/0035566 A1    Feb. 1, 2024

(30) Foreign Application Priority Data
Jan. 14, 2021   (DE) .................. 10 2021 100 602.3

(51) Int. Cl.
F16H 63/34    (2006.01)
(52) U.S. Cl.
CPC .............................. F16H 63/3433 (2013.01)
(58) Field of Classification Search
CPC .............................. F16H 63/34; F16H 63/3433
See application file for complete search history.

(56) References Cited

U.S. PATENT DOCUMENTS

2014/0346004 A1   11/2014   Landino et al.
2017/0292605 A1   10/2017   Hamaya et al.
(Continued)

FOREIGN PATENT DOCUMENTS

CN    110081169 A    8/2019
CN    111412281 A    7/2020
(Continued)

OTHER PUBLICATIONS

Espacenet translation of DE102005024468 (Year: 2006).*
(Continued)

*Primary Examiner* — Lori Wu
(74) *Attorney, Agent, or Firm* — Crowell & Moring LLP

(57) ABSTRACT

A park lock mechanism for a motor vehicle includes a park lock pawl for selectively forming a form-locking connection to a lock region, the park lock mechanism having a locking mode, in which the park lock pawl is moved into a locking position, and a driving mode, in which the park lock pawl is moved into a driving position. The park lock pawl is pivotable about a pawl axis from the locking position into the driving position. A locking pawl spring device preloads the park lock pawl into the driving position. A locking pawl actuation device has a locking pawl actuator with a locking pawl actuator shaft and has a locking pawl cone, the locking pawl cone being movable along a cone axis by the locking pawl actuator. The cone axis is parallel to the pawl axis. The locking pawl cone is movable along the cone axis between a cone driving position and a cone locking position. The parking lock pawl is forced into the locking position against the preload of the locking pawl spring device by the locking pawl cone in the cone locking position. A locking cone lever is provided for moving the locking pawl cone along the cone axis, the locking cone lever being freely rotatable by the locking pawl actuator shaft.

6 Claims, 2 Drawing Sheets

(56) References Cited

U.S. PATENT DOCUMENTS

| | | |
|---|---|---|
| 2018/0180139 A1 | 6/2018 | Wafzig et al. |
| 2019/0072179 A1 | 3/2019 | Pai et al. |
| 2021/0033191 A1 | 2/2021 | Wagner |
| 2021/0396311 A1* | 12/2021 | Greb .................... F16H 63/3441 |
| 2023/0220897 A1* | 7/2023 | Qiu ......................... F16D 23/14 |
| | | 192/219.5 |

FOREIGN PATENT DOCUMENTS

| | | | |
|---|---|---|---|
| CN | 212672385 U | * | 3/2021 |
| DE | 10 2005 024 468 A1 | | 12/2006 |
| DE | 10 2014 223 037 A1 | | 5/2016 |
| DE | 10 2015 211 367 A1 | | 12/2016 |
| DE | 10 2017 203 346 A1 | | 6/2018 |
| DE | 10 2018 204 507 A1 | | 9/2019 |
| JP | 2005-207570 A | | 8/2005 |
| KR | 10-2014-0129901 A1 | | 11/2014 |

OTHER PUBLICATIONS

Espacenet translation of DE102017203346 (Year: 2018).*
International Search Report (PCT/ISA/210) issued in PCT Application No. PCT/EP2021/086201 dated Feb. 28, 2022 with English translation (6 pages).
German-language Written Opinion (PCT/ISA/237) issued in PCT Application No. PCT/EP2021/086201 dated Feb. 28, 2022 (9 pages).
German-language Office Action issued in German Application No. 10 2021 100 602.3 dated Oct. 15, 2021 (5 pages).
German-language Search Report issued in German Application No. 10 2021 100 602.3 dated Oct. 15, 2021 with partial English translation (11 pages).

* cited by examiner

PARK LOCK MECHANISM FOR A MOTOR VEHICLE

BACKGROUND AND SUMMARY

The invention relates to a parking-lock mechanism in a motor vehicle, in particular in an electric vehicle.

In this context, a parking-lock mechanism is to be understood as meaning a mechanism for form-fitting locking of a drive shaft, wherein the drive shaft, at least in the state in which the drive shaft is locked, is permanently coupled to at least one drive wheel of the motor vehicle or to a drive axle. A parking-lock mechanism as such is known from the prior art, in particular of automatic transmissions. In such transmissions, the output shaft from the automatic transmission is generally able to be coupled in a form-fitting manner to the transmission housing, in particular if, for the automatic transmission, the parking mode, so-called "P" mode (P N R D), is selected.

DE 10 2015 211 367 A1 has disclosed an automatic transmission of a vehicle with a central synchronization device and a method for operating an automatic transmission, wherein, in this transmission, it is possible to provide a parking-lock function with a self-locking arrangement.

The provision of the parking-lock function generally requires a mechanically complex mechanism. It is an object of the invention to provide a simple parking-lock mechanism, said object being achieved by a parking-lock mechanism according to the independent claims. The dependent claims relate to preferred refinements of the invention.

Within the context of the invention, a parking-lock mechanism for a motor vehicle is to be understood as meaning a device for form-fitting locking of a drive shaft, wherein said drive shaft is configured for mechanical transmission of power to at least one drive wheel of the motor vehicle. Preferably, said drive shaft is selectively or preferably permanently connected in a torque-conducting manner to said at least one drive wheel. In particular via a configuration of said type, the drive wheel is blocked in a form-fitting manner by means of the park-locking mechanism as soon as the parking lock is engaged.

Furthermore, the drive shaft to be blocked has a blocking region, the blocking region preferably being in the form of a blocking wheel which is oriented concentrically with respect to the drive shaft and which is furthermore preferably connected in a rotationally conjoint manner thereto or is preferably formed in one piece therewith. Furthermore, the blocking region is configured in such a way that at least one parking-lock pawl selectively engages into said blocking region for forming the form-fitting connection. From a functional aspect, the drive shaft, and thus the at least one drive wheel, is blocked when the parking-lock pawl engages into the blocking region of the drive shaft. In other words, the parking-lock mechanism thus has at least two modes, of which a first one can be considered as a so-called blocking mode ("parking lock engaged") and the other one can be considered as a so-called driving mode ("parking lock disengaged"), wherein, in the first mode, the drive wheel is in a state blocked in a form-fitting manner and, in the second mode, this is not the case; rather, in this mode, the drive shaft is rotatable and the at least one drive wheel can be driven via the drive shaft.

Furthermore, the parking-lock pawl is movable at least between two positions by means of the parking-lock mechanism. In the blocking mode, the parking-lock pawl is in a state moved into a blocking position and, in this position, forms the form-fitting connection for blocking the drive shaft with the blocking region. The parking-lock mechanism furthermore has the driving mode, in which the parking-lock pawl is in a state moved into a driving position, in which it does not form a form-fitting connection with the blocking region, the drive shaft in particular being rotatable, for the purpose of driving the motor vehicle, in this mode.

Furthermore, for assuming the blocking position or the driving position, the parking-lock pawl is pivotable about a pawl axis. The parking-lock mechanism has a pawl spring device, which preloads the parking-lock pawl into the driving position. In particular, in a non-actuated state, the pawl spring device holds the parking-lock pawl in the driving position. For changing the position of the parking-lock pawl, the parking-lock mechanism has a pawl-actuating device, which has a pawl actuator with a pawl-actuator shaft and has a pawl cone. The pawl cone is in this case configured to apply, preferably indirectly or preferably directly, an actuation force on the parking-lock pawl that moves the parking-lock pawl from the driving position into the blocking position. In particular for providing the actuation force on the parking-lock pawl, the pawl cone is displaceable or movable along a cone axis by means of the pawl actuator. Furthermore preferably, in relation to the cone axis, the pawl cone at least sectionally has a conical contour, and furthermore preferably, the pawl cone makes contact with the parking-lock pawl, in particular for moving the latter from the driving position into the blocking position.

The cone axis is oriented parallel to the pawl axis and, in this way, in particular by way of the contour of the pawl cone together with the movement of the pawl cone along the cone axis, the parking-lock is pivotable about the pawl axis. The pawl cone is movable along the cone axis into at least two positions, wherein one of these positions is to be regarded as a so-called cone blocking position and the other one is to be regarded as a cone driving position. It is furthermore also the case that the parking-lock pawl is in a state moved into the blocking position when the pawl cone makes contact with it and is in the cone blocking position, or the parking-lock pawl, in this situation, is in a state forced into the blocking position counter to the spring force of the pawl spring device by the pawl cone. If the pawl cone is in the cone driving position, then the parking-lock pawl is in a state forced into the driving position by the pawl spring device and the blocking region of the drive shaft is rotatable in relation to the pawl.

For displacement of the pawl cone along the cone axis, provision is made of a blocking-cone lever which is coupled indirectly or directly to the pawl cone and which is furthermore able to be rotated or pivoted by means of the pawl-actuator shaft of the pawl actuator. The blocking-cone lever is in this case able to be freely rotated by the pawl-actuator shaft. Within the context of the invention, the freely rotatable blocking-cone lever is to be understood as meaning that, in particular in the case of an adjustment of the pawl cone between the cone blocking position and the cone driving position, there act on it only the forces on the blocking-cone lever that are applied via the pawl cone and also unavoidable bearing and mass forces. Furthermore preferably, freely rotatable means that the blocking-cone lever is freely rotatable at least between two end points, in particular it is not necessary that the blocking-cone lever can perform a complete revolution (360° and more) for it to be understood as being freely rotatable within the context of the invention. In particular, a freely movable or freely rotatable blocking-cone lever is not acted on by mechanical additional forces, as can arise in particular in the case of latching of the blocking-cone lever.

Latching of said type may be provided in particular for prioritizing particular geometrical positions of the blocking-cone lever. Such a prioritization may be provided for reducing "play" in the parking-lock mechanism, or for predefining a particular mechanical position of said mechanism in the event of a defective pawl actuator. By contrast, a freely rotatable blocking-cone lever offers the advantage that the parking-lock mechanism is of simple construction and that uniform and precise control of the blocking-cone lever is made possible, since this is movable without mechanically prioritized positions, and thus uniformly, along the cone axis. Furthermore, a parking-lock mechanism is easy to sense since there is a simpler relationship between the movement of the pawl cone and applied operating forces than in a case in which the blocking-cone lever is acted on also by (latching) forces which are not introduced by the pawl cone, and, in particular as a result, improved fault monitoring of the proposed parking-lock mechanism is made possible.

In a preferred embodiment, a decoupling spring device with a decoupling spring is provided between the pawl-actuator shaft and the pawl cone in relation to the transmission of force therebetween. In particular, the decoupling spring device decouples the pawl-actuator shaft from the pawl cone in at least one direction of force transmission. Figuratively speaking, the pawl-actuator shaft indirectly or directly delivers an actuation force to the decoupling spring device when the parking-lock mechanism is actuated, and the decoupling spring device delivers said actuation force to the pawl cone. In a case in which the pawl cone is immovable, in particular because the parking-lock pawl cannot or cannot yet move into the blocking region, firstly the decoupling spring of the decoupling spring device is preloaded by the actuation force from the pawl-actuator shaft without the pawl cone necessarily moving, the latter however exerting an actuation force on the parking-lock pawl. If, owing to a changed geometrical situation, the parking-lock pawl can at another time move into the blocking region and thereby produce the form-fitting connection between the parking-lock pawl and the blocking region, the pawl cone moves under the actuation force from the decoupling spring device into the cone blocking position and in the process rotates the parking-lock pawl into the blocking position. In particular by means of such a decoupling spring device, reliable movement of the parking-lock pawl into the blocking region is achievable, on the one hand, and the pawl-actuator shaft can be decoupled from impulses, as can arise from the parking-lock pawl colliding with the blocking region and not yet producing a form-fitting connection therewith, on the other hand.

In a preferred embodiment of the parking-lock mechanism with decoupling spring device, the decoupling spring, in the direction of force transmission from the pawl-actuator shaft to the blocking-cone lever, is arranged therebetween. Furthermore preferably, the decoupling spring is in the form of a rotary spring or in the form of a volute spring, and furthermore preferably, such a decoupling spring is placed under stress in relation to the blocking-cone lever through rotation of the pawl-actuator shaft and may be understood as being an actuator-decoupling spring. Furthermore preferably, a transmission of force from the pawl-actuator shaft to the blocking-cone lever during intended operation takes place at least temporarily or preferably permanently and at least substantially by means of the decoupling spring. Preferably, the blocking-cone lever is mounted rotatably on the pawl-actuator shaft and, by means of the decoupling spring, for transmission of actuation forces, mechanically coupled thereto, it in other words consequently being the case that transmission of an actuation force from the pawl-actuator shaft to the blocking-cone lever is possible by means of the decoupling spring. In particular a blocking-cone lever which is rotatably mounted and coupled to the decoupling spring constitutes a particularly space-saving arrangement for providing a decoupling function between the pawl-actuator shaft and the pawl cone as actuating element for the parking-lock pawl.

In a preferred embodiment, the decoupling spring, or preferably a further decoupling spring, in the direction of force transmission from the blocking-cone lever to the pawl cone, is arranged therebetween. Preferably, this decoupling spring or further decoupling spring, arranged indirectly or directly between the blocking-cone lever and the pawl cone, is in the form of a spiral spring or in the form of a collection of multiple plate springs and may be understood as being a lever-decoupling spring. Furthermore preferably, such a decoupling spring is placed under stress in relation to the pawl cone through a movement of the blocking-cone lever (driven by the pawl-actuator shaft), in particular when said pawl cone is blocked in terms of its movement along the cone axis. Furthermore preferably, a transmission of force from the blocking-cone lever to the pawl cone during intended operation takes place at least temporarily or preferably permanently and at least substantially by means of this decoupling spring. Preferably, the blocking-cone lever is received in a rotationally conjoint manner on the pawl-actuator shaft and, by means of the decoupling spring, for transmission of actuation forces to the pawl cone, indirectly or directly mechanically coupled thereto. In other words, it is consequently the case that transmission of an actuation force from the blocking-cone lever to the pawl cone is possible by means of the decoupling spring. In particular, such a decoupling spring and thus an elastic coupling of the blocking-cone lever to the pawl cone constitute a particularly simple and operationally reliable arrangement for providing a decoupling function.

In a preferred embodiment, the pawl cone is mounted on a pawl pin so as to be displaceable along the cone axis, wherein the pawl cone on the pawl pin is forced by the lever-decoupling spring into an end position on the pawl pin. Preferably, the lever-decoupling spring is in the form of a compression spring. Furthermore preferably, the lever-decoupling spring is thus arranged indirectly between the blocking-cone lever and the pawl cone. In particular an arrangement of said type makes possible a particularly simple fitting since the pawl pin with pawl cone fitted thereon and lever-decoupling spring is fittable as an assembly, and wherein a particularly simple fitting of this assembly at the blocking-cone lever is made possible.

In a preferred embodiment, the pawl actuator is in the form of a self-locking actuator. Within the context of the invention, a self-locking actuator is to be understood as meaning in particular an actuator which, without external application of power, in particular current and voltage, holds the position of the pawl-actuator shaft, even if operating forces act, in particular via the blocking-cone lever, on the pawl-actuator shaft. In particular by means of such a manifestation of the invention, simple construction of the parking-lock mechanism is made possible since no additional, in particular mechanical, locking means are required to maintain a particular position of the pawl-actuator shaft.

In a preferred embodiment of the invention, the pawl actuator has a pawl sensor for ascertaining the position of the pawl-actuator shaft. Furthermore preferably, the pawl sensor is in the form of a rotational-angle sensor. In particular by way of a pawl sensor, the position of the pawl-actuator shaft is detectable and monitoring of the function of the pawl actuator is consequently made possible.

Individual features of the invention and a preferred embodiment thereof are discussed in more detail below on the basis of the figures, other feature combinations than those illustrated also being fundamentally possible here.

DETAILED DESCRIPTION OF THE DRAWINGS

Figure 1:
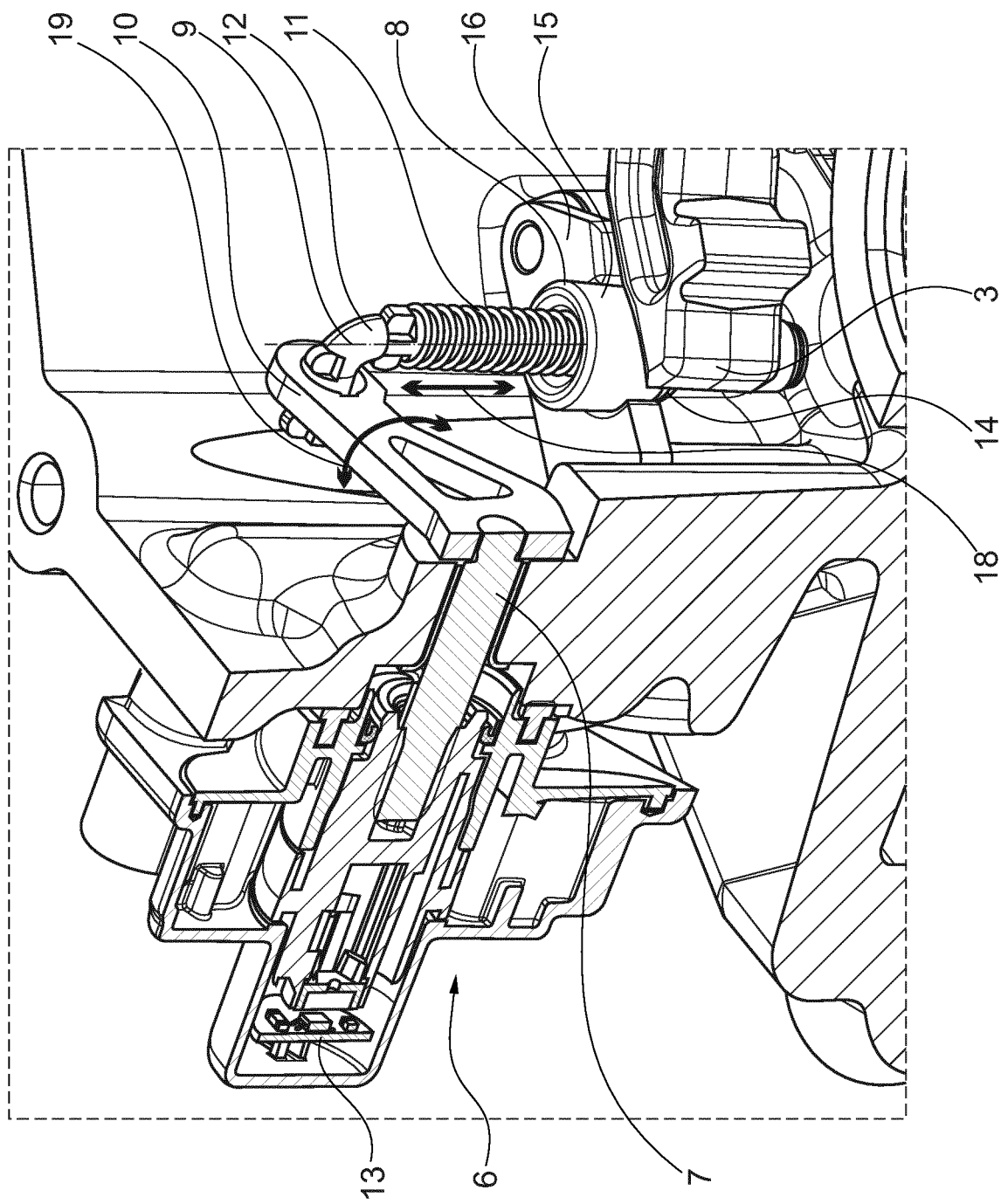
FIG. 1 is a perspective illustration, partly in section, of an embodiment of the parking-lock mechanism.

FIG. 1 illustrates a perspective view, partly in section, of the parking-lock mechanism, the drive shaft to be blocked, or to be locked in a form-fitting manner, by way of said mechanism not being illustrated in this figure.

The pawl actuator 6 is a rotary actuator which has a pawl-actuator shaft 7 for delivering the actuation force to the pawl cone 8. The pawl actuator 6 is in the form of a self-locking actuator, this being understood as meaning that, with the pawl actuator 6 deactivated, the position of the pawl-actuator shaft 7 is maintained without energy (in particular current, voltage) being supplied from outside the pawl actuator 6, even if a force is exerted, in particular by the pawl cone 8, on the blocking-cone lever 10. Self-locking in the pawl actuator 6 can be achieved in particular via the friction conditions in the pawl actuator 6.

The pawl actuator 6 furthermore has a pawl sensor 13, by way of which the position of the pawl-actuator shaft 7 is able to be detected, and the operating state of the parking-lock mechanism is thus able to be monitored. The pawl actuator 6 is illustrated in section. The blocking-cone lever 10 is arranged in a rotationally conjoint manner on the pawl-actuator shaft 7 and is able to be pivoted in a blocking-cone lever direction 19 thereby. A rotational movement of the pawl-actuator shaft 7 thus leads to a movement of the blocking-cone lever 10. The pawl pin 12 is kinematically coupled to the blocking-cone lever 10. The pawl cone 8, which at least sectionally has a conical outer contour 14, is arranged on the pawl pin 12, wherein the cone axis 9 forms the axis of symmetry for this conical section 14.

The pawl cone 8 is mounted displaceably on the pawl pin 12 along the cone axis 9, that is to say in the cone-movement direction 18, and, by means of the lever-decoupling spring 11, this being in the form of a compression spring, is preloaded into a position in the downward direction in the illustrated embodiment. Thus, if the pawl pin 12 is moved by the blocking-cone lever 10 in the cone-movement direction 18, and no or only small forces act on the pawl cone 8 from the parking-lock pawl 3, then said pawl cone is moved along with the pawl pin 12. If, however, a direct inward movement of the parking-lock pawl 3 is not possible, because this in particular cannot engage into the blocking region 2, in particular owing to the rotational position of the blocking region 2, then the blocking-cone lever 10 pushes the pawl pin 12 in a downward direction in the illustrated orientation in FIG. 1 but the pawl cone 8 initially remains in its position (despite the movement of the blocking-cone lever 10) and the lever-decoupling spring 11 is placed under stress. If the blocking region 2 is then, in relation to the pawl 3, in a position in which said pawl can engage into the blocking region 2 in order to form the form-fitting connection, the lever-decoupling spring 11 pushes the pawl cone 8 downward (in relation to the orientation illustrated in FIG. 1) and the parking-lock pawl 3 is pivoted into the illustrated blocking position.

Figure 2:
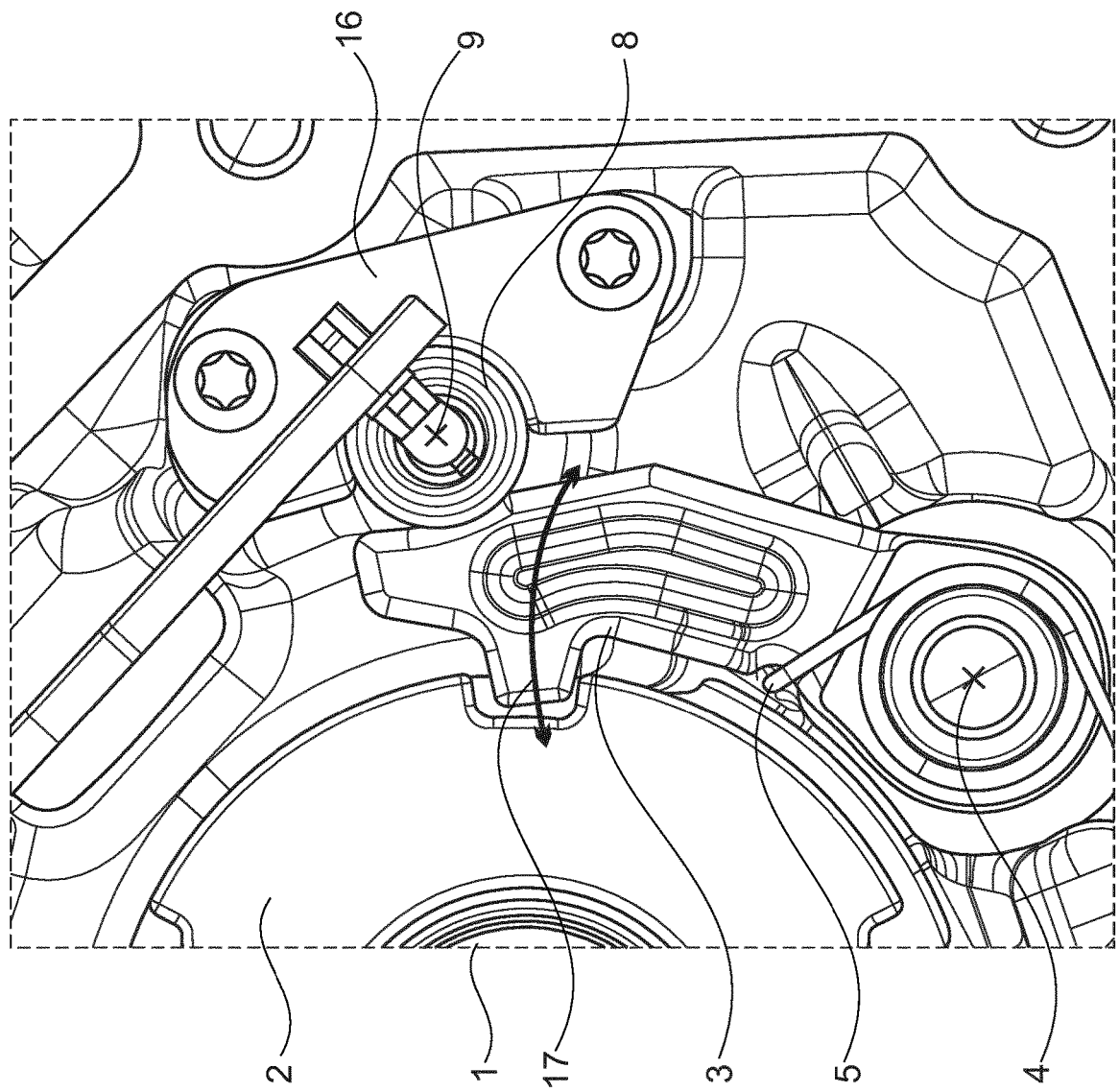
FIG. 2 is a plan view of the parking-lock mechanism.

In the illustration in FIG. 1, the pawl cone 8 is in its blocking cone position, and the parking-lock pawl 3 bears against the cylindrical section 15 of the pawl cone 8 and is consequently in a state pivoted into its blocking position counter to the spring preload of the pawl spring device 5 (see FIG. 2). For displacement of the parking-lock pawl 3, the pawl cone 8 is supported against a counterbearing plate 16.

FIG. 2 illustrates the parking-lock pawl 3 in the inwardly moved state (blocking position), that is to say the parking-lock pawl 3 forms a form-fitting connection with the blocking region 2 of the drive shaft 1 and the drive shaft 1 is locked or not rotatable. The parking-lock pawl 3 is movable in the pivoting direction 17 about the pawl axis 4, this being arranged axially parallel to and radially spaced apart from the cone axis 8. The parking-lock pawl 3 is preloaded into a driving position (not illustrated) by means of the pawl spring device 5. The pawl cone 8, for engagement of the parking-lock pawl 3, is displaced along the cone axis 8 and, for applying an actuation force, is supported against the counterbearing plate 16 counter to the spring preload of the pawl spring device 5.

In other words, the parking-lock mechanism discussed functions without additional latching since the blocking-cone lever 10 is freely rotatable. Latching makes possible assisting and ensuring of a defined position status. The proposed parking-lock mechanism dispenses in particular with such latching. The invention proposes to make possible the positioning of the parking-lock mechanism by means of a self-locking pawl actuator which cannot, or during intended operation cannot, be moved from its actuating position (rotational position of the pawl-actuator shaft) by means of forces introduced via the blocking-cone lever 10. In the illustrated embodiment, the pawl actuator 6 is plugged directly onto the actuating mechanism.

The proposed invention makes it possible for additional components and interfaces of the parking-lock mechanism to be made less complex. The position monitoring of the pawl-actuator shaft 7 is realized by way of a pawl sensor 13 on the pawl actuator 6. The tolerance chain of those components of the parking-lock mechanism which are involved in the transmission of movement is thus ensured via a robust target position of said mechanism.

The invention claimed is:

1. A parking-lock mechanism for a motor vehicle having a drive shaft configured for mechanical transmission of power to at least one drive wheel, the drive shaft having at least one blocking region, the parking-lock mechanism comprising:
    a parking-lock pawl configured to selectively form a form-fitting connection with the blocking region,
    wherein the parking-lock mechanism has a blocking mode, in which the parking-lock pawl is in a state moved into a blocking position and forms the form-fitting connection with the blocking region, and a driving mode, in which the parking-lock pawl is in a state moved into a driving position, in which the parking-lock pawl does not form a connection with the blocking region,
    wherein the parking-lock pawl is pivotable about a pawl axis from the blocking position into the driving position;
    a pawl spring device which preloads the parking-lock pawl into the driving position; and a pawl-actuating device which has a pawl actuator with a pawl-actuator shaft and has a pawl cone, wherein the pawl cone is movable along a cone axis via the pawl actuator, wherein said cone axis is oriented parallel to the pawl axis, wherein the pawl cone is movable along the cone axis between a cone driving position and a cone blocking position, and wherein the parking-lock pawl is in a state forced into the blocking position counter to the preload of the pawl spring device by the pawl cone in the cone blocking position; and a blocking-cone lever for displacement of the pawl cone along the cone axis, wherein the blocking-cone lever is freely rotatable by the pawl-actuator shaft, wherein a rotational force of the pawl actuator, the pawl actuator shaft, and the blocking-cone lever have a common actuation axis of rotation, and wherein the blocking-cone lever is directly connected to the pawl actuator via the pawl actuator shaft.

2. The parking-lock mechanism according to claim 1, wherein a decoupling spring device with a decoupling spring is provided between the pawl-actuator shaft and the pawl cone in the direction of force transmission.

3. The parking-lock mechanism according to claim 2, wherein the decoupling spring, in the direction of force transmission from the blocking-cone lever to the pawl cone, is arranged therebetween and is in the form of a lever-decoupling spring, and at least partial transmission of an actuation force from the blocking-cone lever to the pawl cone is possible via the lever-decoupling spring.

4. The parking-lock mechanism according to claim 3, wherein the pawl cone is mounted on a pawl pin so as to be displaceable along the cone axis, and transmission of the actuation force to the pawl cone is possible at least partially or completely by the lever-decoupling spring.

5. The parking-lock mechanism according to claim 1, wherein the pawl actuator is in the form of a self-locking actuator.

6. The parking-lock mechanism according to claim 1, wherein the pawl actuator has a pawl sensor for ascertaining a position of the pawl-actuator shaft.

* * * * *